United States Patent [19]

Herzl

[11] Patent Number: 4,550,614
[45] Date of Patent: Nov. 5, 1985

[54] OSCILLATORY FLOWMETER

[75] Inventor: Peter J. Herzl, Morrisville, Pa.

[73] Assignee: Fischer & Porter Company, Warminster, Pa.

[21] Appl. No.: 691,003

[22] Filed: Jan. 14, 1985

[51] Int. Cl.[4] .................................................. G01F 1/20
[52] U.S. Cl. ................................... 73/861.19; 137/804
[58] Field of Search .................... 73/861.19; 137/804, 137/831, 834, 835

[56] References Cited

U.S. PATENT DOCUMENTS 4,165,639 8/1979 Adams ............................... 73/861.19
4,244,230 1/1981 Bauer ............................... 73/861.19

Primary Examiner—Herbert Goldstein
Attorney, Agent, or Firm—Michael Ebert

[57] ABSTRACT

Each guide member of a fluidic oscillator has a diverter which acts to split the flow from the power nozzle into a control stream that is diverted toward the inlet of an associated feedback path and an output stream that is directed toward an output duct. The resultant fluidic forces exerted alternately on the diverters are sensed, and the sensor outputs are processed to generate a sinusoidal wave from which volumetric flow or mass flow output signals are derived.

10 Claims, 9 Drawing Figures

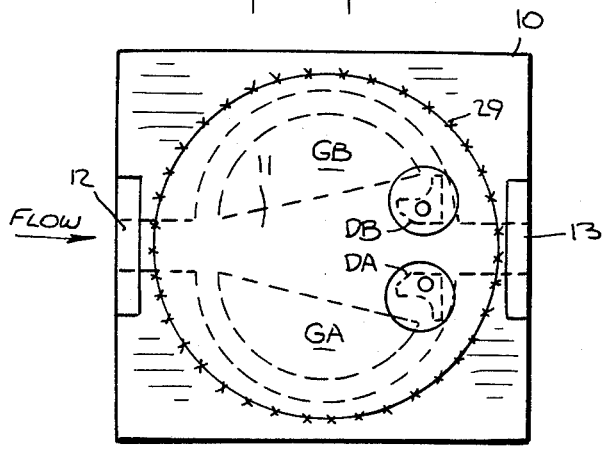
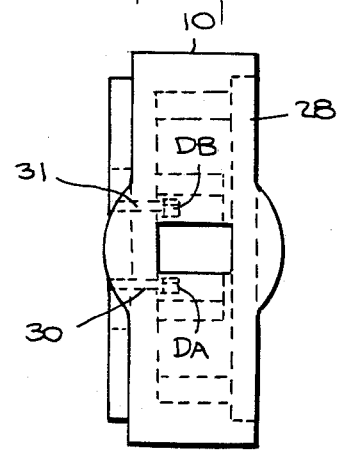
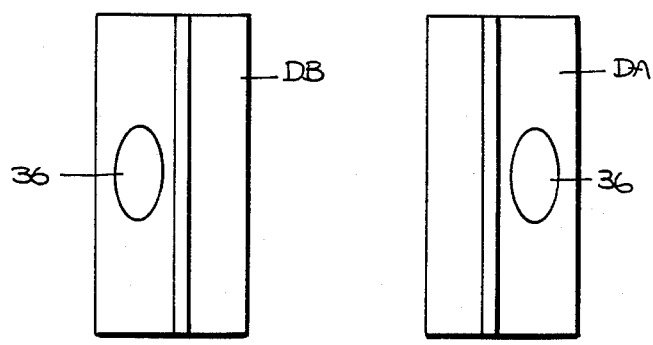
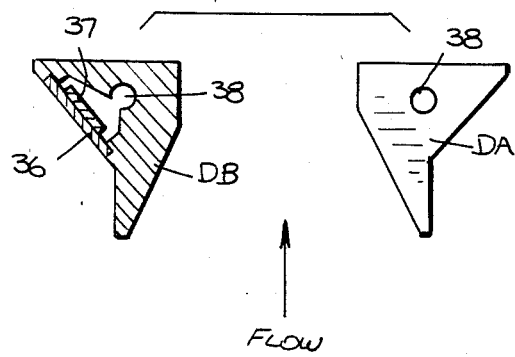

OSCILLATORY FLOWMETER

BACKGROUND OF INVENTION

1. Field of Invention:

This invention relates generally to oscillatory flowmeters in which a jet stream of incoming fluid is periodically switched in the interaction zone of a steering chamber from one guide to another to generate fluidic oscillations therein which are sensed to generate an output signal, and more particularly, to a meter of this type capable of measuring both mass flow and volumetric flow.

2. State of Art:

As pointed out by Wilson et al. in their article "Experimental Investigation of a Fluidic Volume Flowmeter" in the March 1970 issue of the *Journal of Basic Engineering* (ASME), the most important characteristic of a good flowmeter is an output signal that is linearly related to the quantity being measured. Other features found only in good flowmeters are reliability, and the absence of moving parts that can be jammed with debris. The accuracy of a good flowmeter should be unaffected by changes in the properties of the fluid being metered and by variations in ambient conditions, such as temperature and pressure.

Because no one available type of flowmeter satisfies all of the requisite features and characteristics of a good flowmeter, existing flowmeters fall short of many industrial needs and the search for new flow-metering techniques remains a continuing process. The Wilson et al. article deals with a new type of oscillatory flowmeter that possesses many of the features one looks for in a commercially-acceptable meter.

A more detailed description of an oscillatory flowmeter appears in the 1972 Adams U.S. Pat. No. 3,640,133. In the Adams meter, incoming fluid is fed as a jet stream into a steering chamber through a power nozzle, the chamber being provided with an output duct which is in line with the power nozzle. Disposed within the steering chamber are twin guides which diverge from the power nozzle. These guides are spaced from each other to define an interaction zone and are spaced from the opposing sidewalls of the chamber to define feedback paths. Each path has an inlet at the downstream end of the related guide and an outlet at the upstream end which functions as a control nozzle.

The Adams meter exploits the Coanada effect; that is, the natural tendency of a fluid jet to follow the contour of a wall when the jet is discharged adjacent to the wall surface, even when this surface is curved away from the jet discharge axis. In the Adams meter, the fluid jet emitted from the power nozzle attaches itself to the wall of one of the diverging guides and is conducted downstream thereby into the inlet of the associated feedback path which leads the fluid to the outlet control nozzle. The fluid projected from the control nozzle into the interaction zone between the guides acts to deflect the jet emitted from the power nozzle toward the wall of the other guide where the same hydraulic action is repeated.

As a consequence, the jet in the steering chamber of the Adams meter switches periodically from guide to guide to generate fluidic oscillations whose frequency is proportional to the volumetric flow rate. In this oscillatory flowmeter, the relationship is the same for all liquids and gases in the turbulent range, and the calibration of the flowmeter is therefore independent of the properties of the fluid.

In order to convert the fluidic oscillations into an electrical signal having a corresponding frequency, Adams inserts a sensing probe into the steering chamber between the guides, the probe being mounted on a bellows and being caused to vibrate at a rate in accordance with the frequency of the oscillating fluid. This probe is operatively coupled to the movable core of a variable transformer external to the steering chamber.

The Adams sensor arrangement is relatively insensitive and performs poorly at low flow rates. And because the sensor is of the vibratory type, it is also responsive to externally-generated vibratory forces and therefore exhibits a poor signal-to-noise ratio. Moreover, the Adams meter only generates a signal that is indicative of flow rate, and yields no signal as a function of mass flow. In industrial flow measurement, it is often necessary to provide a reading of mass flow—that is, the mass of fluid flowing past or through a reference plane per unit of time.

Vortex type meters, such as the meters disclosed in my prior Herzl U.S. Pat. Nos. 3,776,033 and 4,010,645, are capable of measuring mass flow as well as volumetric flow of fluids being treated or supplied in industrial processes. However, such meters which make use of a vortex shedding body placed in the flow stream are unreliable and inaccurate below pipe Reynolds numbers of 5000, and they are non-functional below pipe Reynolds numbers of 3000. Hence, these meters cannot be made in pipe sizes of less than about 1 inch.

SUMMARY OF INVENTION

In view of the foregoing, the main object of this invention is to provide an oscillatory flowmeter capable of generating an output signal whose frequency is a linear function of volumetric flow or is proportional to mass flow.

A significant advantage of a flowmeter in accordance with the invention is that it may be made in very small pipe sizes of one inch or less to accurately and reliably measure very low flow rates of liquids or gases.

Also an object of the invention is to provide a low-cost meter of the above type exhibiting improved hydraulic performance as compared to known types of oscillatory flowmeters.

Still another object of the invention is to provide an oscillatory flowmeter in which force sensors serve to detect the fluidic oscillations and to directly convert the sensed forces to an electrical signal, thereby dispensing with the need for external power. Thus, one may use a two wire line from the sensors at a field installation of the meter to remote indicating or control stations; for there is no need for a third line to convey power to the field station.

Yet another object of the invention is to provide a meter which is insensitive to externally-generated vibratory forces.

Briefly stated, these objects are attained in an oscillatory flowmeter whose output signal is a linear function of flow rate or is proportional to mass flow. In the meter body, a fluid jet stream is projected through a power nozzle into a steering chamber from which the fluid exits through an output duct in line with the power nozzle. Diverging from the power nozzle are twin guides that are spaced from each other to define an interaction zone and from the opposing sidewalls of the chamber to define feedback paths, each having an inlet at the downstream end of the related guide and an outlet at the upstream end which functions as a control nozzle. Each guide conducts the jet stream toward its own diverter which acts to split flow into a control stream that is diverted toward the inlet of the associated feedback path and an output stream that is directed toward the chamber output duct. In operation, the jet stream emitted by the power nozzle attaches itself to the outer wall of one of the guides and is conducted thereby to the related diverter to create a control stream which flows through the feedback path to be discharged from its control nozzle into the interaction zone where it deflects the incoming jet toward the inner wall of the other guide where the same hydraulic action is repeated. The resultant fluidic forces exerted alternately on the diverters are sensed, and the sensor outputs are processed to generate a sinusoidal wave from which volumetric flow or mass flow output signals are derived.

OUTLINE OF DRAWINGS

For a better understanding of the invention as well as other objects and further features thereof, reference is made to the following detailed description to be read in conjunction with the accompanying drawings, wherein:

FIG. 1 schematically illustrates an oscillatory flowmeter in accordance with the invention, the arrows in this figure indicating flow direction with respect to one of the guides;

FIG. 4 is a top view of a preferred flowmeter structure;

Fig. 5 is a side view of the structure;

FIG. 8 shows in side view a pair of diverter assemblies fitted with force-pressure sensors; and FIG. 9 is a plan view of the assemblies shown in FIG. 8, the left assembly being a section taken in the plane indicated by line 9—9 in FIG. 8.

DETAILED DESCRIPTION OF INVENTION

Figure 1:
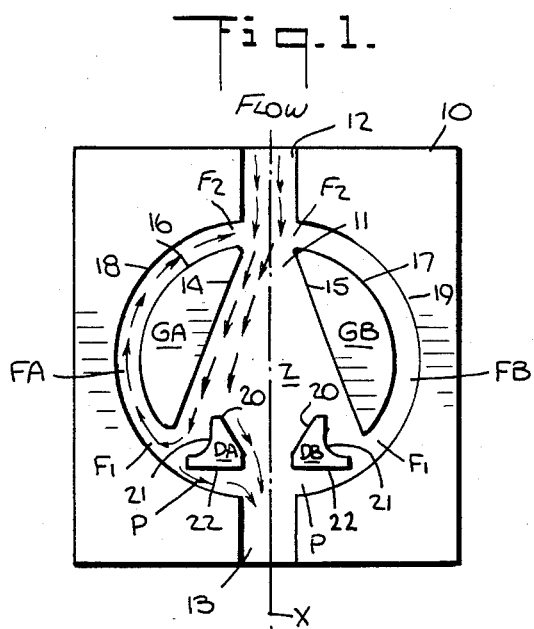

The Flowmeter Primary:

Referring now to FIG. 1, there is schematically shown an oscillatory flowmeter in accordance with the invention, the meter being provided with a square-shaped body 10 having a generally circular cavity formed centrally therein to define a steering chamber 11.

A jet stream of incoming fluid to be metered is fed into the input chamber 11 through a power nozzle 12 having a rectangular cross section. The nozzle lies on a longitudinal flow axis X which extends through the middle of body 10. Fluid is discharged from the chamber through an output duct 13 in axial alignment with power nozzle 12.

Disposed symmetrically with respect to power nozzle 12 within steering chamber 11 are twin segment-shaped guides GA and GB. The flat inner boundary walls 14 and 15 of guides GA and GB, respectively, diverge outwardly from nozzle 12, an interaction zone Z being defined between the spaced guides. The curved outer walls 16 and 17 of guides GA and GB are spaced from the similarly-curved opposing sidewalls 18 and 19 of the steering chamber to define arcuate feedback paths FA and FB.

Each of these feedback paths has an inlet $F_1$ at the downstream end of its related guide and an outlet $F_2$ at the upstream end adjacent the power nozzle 12. Outlet $F_2$ functions as a control nozzle in a manner to be later explained.

Disposed symmetrically with respect to output duct 13 in steering chamber 11 are twin diverters DA and DB. Diverter DA is provided with a flat inner side wall 20 which is sloped in the downstream direction, and a concave outer side wall 21 which lies adjacent inlet $F_1$ to the feedback path FA to divert fluid into this inlet. The rear wall 22 of diverter DA is spaced from the curved sidewall 18 of the meter body to define a bypass passage P. The physical relationship of diverter DB to guide GB and to sidewall 19 of the meter body exactly corresponds to that of diverter DA.

Operation:

In operation, a fluid jet stream (liquid or gas) projected into steering chamber 11, because of the Coanada effect, tends to attach itself to either the flat boundary wall 14 of guide GA or to the flat boundary wall 15 of guide GB. In FIG. 1, the jet stream, as indicated by the arrows, attaches itself to boundary wall 14 of guide GA and therefore is conducted toward the downstream end of this wall.

At the downstream end, the fluid jet stream is intercepted by diverter DA which effectively splits the stream into two distinct streams, namely a control stream and an output stream. Control stream is diverted by concave wall 21 into the inlet $F_1$ of feedback path FA, whereas the sloped, flat wall 20 directs the output stream toward output duct 13. Bypass passage P behind diverter DA, in the case of liquid measurement, acts to clean any gases which might be trapped when liquid flow is first started through the flowmeter.

Figure 2:
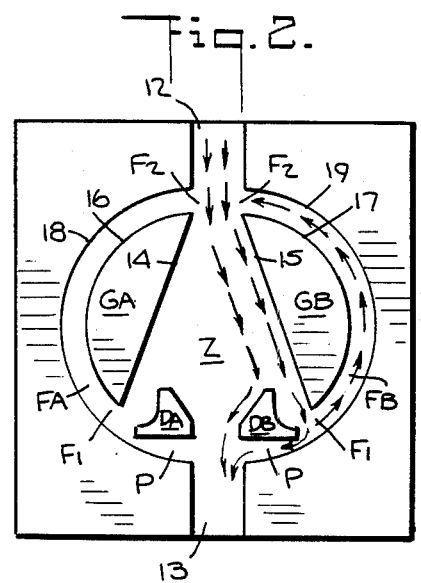
FIG. 2 is the same as FIG. 1, except that the arrows indicate flow direction with respect to the other guide.

The control stream which enters the inlet $F_1$ of the feedback path FA is led thereby to its outlet $F_2$, which functions as a control nozzle. The fluid discharged from the control nozzle is projected into the interaction zone Z and acts to deflect the jet stream emitted from the power nozzle 12 toward the flat boundary wall 15 of the other guide GB. As shown in FIG. 2, the same hydraulic action is repeated with respect to guide GB, at the end of which the jet stream is switched back toward guide GA.

Thus, as in a conventional oscillatory flowmeter, the periodic switching back and forth of the jet stream produces a fluidic oscillation whose frequency is a function of the volumetric flow rate of the fluid being metered.

The significant difference between the present arrangement and that found in a conventional oscillatory flowmeter resides in the presence of diverters DA and DB which, in addition to carrying out the above-described hydraulic functions, make it possible to sense fluidic oscillations without inserting a vibratory probe or other obstacle into the interaction zone Z between guides GA and GB.

Signal Detection:

When the jet stream flows along guide GA, as in FIG. 1, a substantial force FA is then exerted on diverter DA; and when the jet stream is switched to flow along guide GB, a substantial force FB is then exerted on diverter DB.

Figure 3:
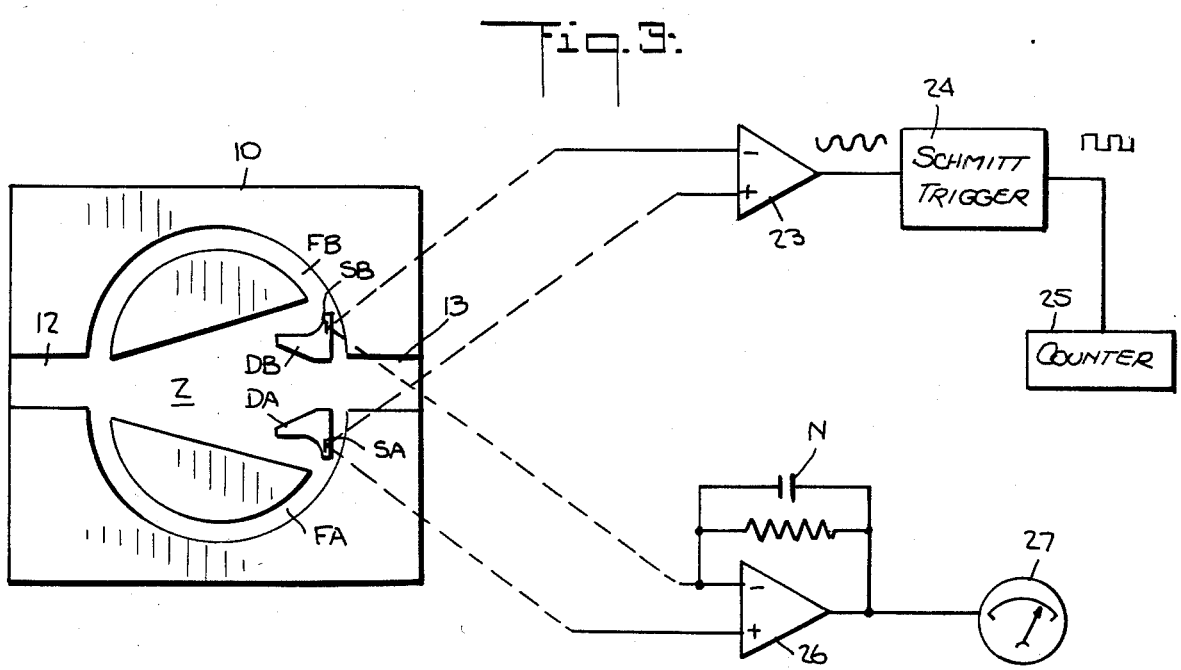
FIG. 3 is a schematic circuit diagram showing an oscillatory flowmeter primary whose sensors are connected to a secondary yielding both an output signal indicative of flow rate and an output signal indicative of mass flow.

These forces which are imposed alternately on diverters DA and DB can be sensed in various ways, the simplest being a piezoelectric, silicon capacitive or wire strain gauge installed in each diverter. These sensors are represented in FIG. 3 by sensors SA and SB placed in diverters DA and DB, respectively. If the output signal of the meter is constituted by the combined outputs of sensors SA and SB, a sinusoidal output signal will be produced as the flow periodically switches between states, thereby yielding an output signal proportional to volumetric flow.

Thus in FIG. 3, the sensors FA and FB are connected to the input of a differential amplifier 23 whose sinusoidal output is applied to a Schmitt trigger 24. This trigger yields pulses whose repetition rate corresponds to the fluidic oscillatory frequency. These pulses are applied to a digital counter 25 to provide a reading of flow rate.

A meter provided with a pair of diverters DA and DB of the type described hereinabove is insensitive to externally-generated vibrations. The reason for this is that vibrations in the X, Y and Z planes will exert the same forces on the diverters. Inasmuch as the output signal is generated by the force imposed on diverter DA minus the force imposed on diverter DB, common mode vibrations effects are cancelled out in differential amplifier 23. Hence the meter will operate reliably and accurately in rigorous environments which subject the meter to vibration and mechanical shocks.

Mass Flow:

The force exerted on each diverter by the change in direction of the fluid stream is a function of mass×(velocity)$^2$ or force=constant$_{(1)}$×mass (velocity)$^2$. The frequency output of the flowmeter is a function of velocity or velocity=constant $_{(2)}$×frequency. Therefore, $$\frac{\text{Force}}{\text{Constant}_{(2)} \times \text{Frequency}} = \frac{\text{Constant}_{(1)} \times \text{Mass (Velocity)}^2}{\text{Velocity}}$$

or, $$\frac{\text{Force}}{\text{Frequency}} = \text{Constant}_{(2)} \times \text{Constant}_{(1)} \times \text{Mass} \times \text{Velocity}$$

Since Mass×Velocity=Mass Flow, $$\text{Mass Flow} = \frac{\text{Force}}{\text{Frequency}} \times \text{Constant}_{(3)}$$

In order to derive a mass flow reading from sensors SA and SB, the respective outputs thereof are applied to the inverting (−) and non-inverting (+) inputs of an operational amplifier 26. The output of amplifier 26 is coupled to the inverting input by a frequency-responsive network N, imparting a 1/f characteristic to the amplifier.

The frequency of the signal yielded in the output of amplifier 26 whose inputs are coupled to the force sensors correspond to the frequency of the fluidic oscillations, whereas the amplitude of this signal is a function of the kinetic energy contained in the fluidic oscillations in accordance with the following equation:

$$A = WV^2/2g = K_1 WV^2 - K_2 \times \text{density} \times f^2$$

where:

A is the signal amplitude
W is the fluid mass
V is the fluid velocity
g is the gravity
A is the signal frequency
K$_1$ and K$_2$ are constants.

If therefore we divide signal amplitude (A) by frequency (f), we obtain K times density times f which equals mass flow. Because operational amplifier 26 divides 1 by f, the output thereof has an amplitude proportional to mass flow. Thus, output is applied to a mass flow indicator 27.

Meter Construction:

A preferred form of meter construction is shown in FIGS. 4 and 5 where it will be seen that the square meter body 10 which includes power nozzle 12, output duct 13, and a steering chamber 11 therebetween, is completed by a disc-shaped cover 28. The cover is welded to the body by a circular seam 29.

Flow guides GA and GB are mechanically attached to body 10 when it is of metal construction. Having separate flow guide components simplifies machining of the important areas of the metal body and makes possible fabrication of a more accurate flowmeter. However, in the case of a molded plastic flowmeter, the guides would then be injection molded as part of the flowmeter body.

The diverter assemblies DA and DB are cantilevered into the steering chamber by posts 30 and 31 and can be welded or mechanically mounted to the body.

Sensors:

The ideal sensor is one that would only sense the force imposed on diverters DA and DB which then diverts the fluid being metered about guides GA and GB, the sensor being insensitive to pressure changes in the fluid.

In practice, however, the sensor design must take into account certain mechanical considerations, for the sensor must be unbreakable and must also have a high resonance frequency so that it is not excited into vibration by the fluidic oscillations. A sensor which satisfies these mechanical considerations may not be as sensitive as is desirable for low density gas service.

Sensors that respond both to the forces imposed on the diverters and fluid pressure are acceptable in practice, for the output signal is derived by subtracting the outputs of sensors SA and SB. Hence, as long as the sensors have the same sensitivity, pressure effects cancel out. Such sensors are particularly attractive for gases in the low-pressure range as are encountered, for example, in measuring air flow in an automobile engine.

In a diverter arrangement as shown in FIGS. 4 and 5 where diverters DA and DB are cantilevered from the body, the sensors therefore may take the form of strain-measuring gauges installed inside of the diverters to measure the bending force imposed on each diverter by the change of direction of the fluid passing around the associated flow guide.

These gauges could be in the piezoelectric family, which produces an electrical voltage when stressed, such as quartz, lithium niobate, lead metaniobate, or lead zirconate titanate. Also usable are piezo-resistive devices such as silicon strain gauges or wire strain gauges. Depending on their location, these gauges will respond mainly to drag stresses and will exhibit little response to pressure fluctuations in the meter.

Figure 7:
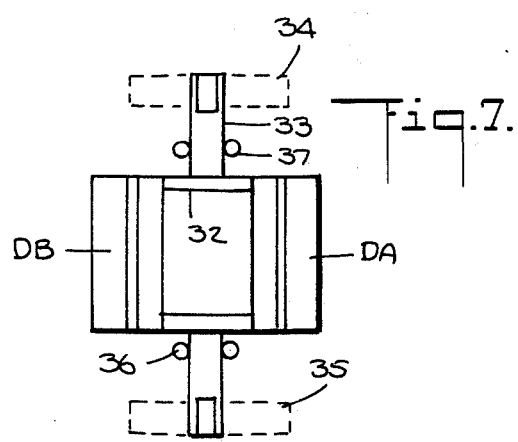
FIG. 7 is a side view of the dual diverter.
Figure 6:
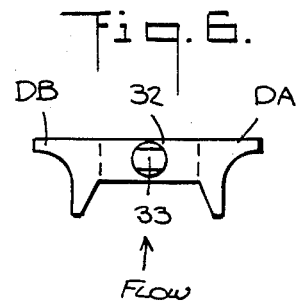
FIG. 6 shows in top view a dual diverter.

Another approach to the design of suitable diverter-sensor assemblies is shown in FIGS. 6 and 7 where instead of separate diverters DA and DB as in FIGS. 1 to 5, the twin diverters are joined together by means of a bridge 32 to form a unitary structure centrally supported on a torsion shaft 33. This shaft extends through the body of the meter and is attached at each end to opposing torque sensors 34 and 35. The ends of the shaft pass through and are sealed by 0-rings 36 and 37 in the body. A torque sensor arrangement of this type is described in greater detail in my prior Herzl U.S. Pat. No. 4,262,544 (1981) "Torque Transducer in Vortex Shedding Flowmeter Having Torsional Sensor".

In the diverter arrangement shown in FIGS. 8 and 9, each of diverters DA and DB is fitted on its concave side with a thin disc 36 which may be of metal, ceramic or plastic, onto whose rear face is bonded a disc 37 of piezoelectric material in a so-called "UNIMORPH" construction. The wire leads from disc 37 and is taken out through a bore 38 in the diverter.

In operation, the force imposed on the outer face of disc 36 of the diverted fluid microscopically deflects the impact area of the sensor assembly. This deflection stresses the piezoelectric disc 37.

The diverter-sensor assembly shown in FIGS. 8 and 9 can be made highly sensitive at low cost. This type of sensor also detects fluid pressure changes, but because of the differential nature of the sensing system associated therewith as shown in FIG. 3, pressure changes are cancelled out as common-mode noise. This type of sensor is most useful for low pressure gases such as natural gas. Other types of pressure sensors could be used, such as the capacitive compression type.

The diverter-sensor assemblies shown in FIGS. 8 and 9 may be cantilevered in the meter body in the manner shown in FIG. 5. Where the sensors are piezoelectric voltage generators, no need then exists for an external power source.

While there has been shown and described a preferred embodiment of OSCILLATORY FLOWMETER in accordance with the invention, it will be appreciated that many changes and modifications may be made therein without, however, departing from the essential spirit thereof.

I claim:

1. An oscillatory flowmeter yielding an output signal whose frequency is a linear function of flow rate, said flowmeter comprising:
   A. a meter body having a steering chamber therein, a power nozzle to project a jet stream of the fluid being metered into the chamber, and an output duct in line with the power nozzle to provide a fluid exit from the chamber;
   B. twin guides disposed in the chamber on either side of the power nozzle to define an interaction zone, the inner walls of the guides diverging outwardly from the power nozzle, the outer walls of the guides being spaced from the opposing sidewalls of the chamber to define feedback paths, each having an inlet at the downstream end of the related guide and an outlet at the upstream end forming a control nozzle adjacent the power nozzle;
   C. twin diverters disposed in the chamber on either side of the output duct, each diverter acting to split the jet stream which is emitted from the power nozzle and attaches itself to the inner wall of the related guide into a control stream which is diverted toward the inlet of the feedback path and an output stream which is directed toward the output duct, the control stream which flows through the feedback path and is discharged from its control nozzle acting in the interaction zone to deflect the incoming jet toward the inner wall of the other guide where the same hydraulic action is repeated, whereby the jet stream is switched alternately from guide to guide; and
   D. means to sense the resultant fluidic forces exerted on the diverters to produce said output signal.

2. A flowmeter as set forth in claim 1, wherein said chamber has a circular shape and said twin guides are segmentshaped, the inner wall of each guide being flat and the outer wall having a curvature which conforms to the curvature of the related sidewalls of the chamber.

3. A flowmeter as set forth in claim 1, wherein said power nozzle has a rectangular cross-section.

4. A flowmeter as set forth in claim 1, wherein said sensing means is constituted by a sensor element associated with each diverter.

5. A flowmeter as set forth in claim 4, wherein the outputs of said sensors are applied to a differential amplifier to produce a sinusoidal wave whose frequency is proportional to the flow rate, each wave being applied to a Schmitt trigger to produce pulses which are counted to provide a flowrate reading.

6. A flowmeter as set forth in claim 4, wherein the outputs of said sensors are applied to an operational amplifier whose output is inversely proportional to frequency whereby the amplitude of the output is proportional to mass flow.

7. A flowmeter as set forth in claim 1, wherein each diverter includes a concave side wall which diverts the jet stream toward the inlet of the feedback path, and a sensor disposed across the concave side constituted by a thin deflectable disc having a piezoelectric disc bonded thereto to provide an output voltage in accordance with the fluidic force impinging on the deflectable disc.

8. A flowmeter as set forth in claim 1, wherein each diverter is mounted on a torsion shaft coupled to a torsion sensor.

9. A flowmeter as set forth in claim 8, wherein said torsion sensor is a piezoelectric element.

10. A flowmeter as set forth in claim 8, wherein said torsion sensor is a capacitive sensor.

* * * * *